(12) United States Patent
Iyengar et al.

(10) Patent No.: US 10,587,681 B2
(45) Date of Patent: *Mar. 10, 2020

(54) DEPLOYMENT OF MULTI-TASK ANALYTICS APPLICATIONS IN MULTI-CLOUDS

(71) Applicant: International Business Machines Corporation, Armonk, NY (US)

(72) Inventors: Arun Iyengar, Yorktown Heights, NY (US); Wei Tan, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/025,803

(22) Filed: Jul. 2, 2018

(65) Prior Publication Data

US 2018/0316750 A1 Nov. 1, 2018

Related U.S. Application Data

(63) Continuation of application No. 14/950,496, filed on Nov. 24, 2015, now Pat. No. 10,063,634.

(51) Int. Cl.
*H04L 29/08* (2006.01)
*H04L 12/923* (2013.01)
(Continued)

(52) U.S. Cl.
CPC ............ *H04L 67/1012* (2013.01); *G06F 8/60* (2013.01); *H04L 29/08135* (2013.01);
(Continued)

(58) Field of Classification Search
CPC ....... H04L 41/5041–5054; H04L 67/10; H04L 67/1097; H04L 29/08135; H04L 41/12;
(Continued)

(56) References Cited

U.S. PATENT DOCUMENTS 8,244,874 B1 8/2012 Thireault
8,504,689 B2* 8/2013 Ferris .................... G06F 9/5072
  709/226
(Continued)

OTHER PUBLICATIONS

Tan, W., et al., "Scientific Workflows as Services in caGrid: a Taverna and gRAVI Approach," IEEE International Conference on Web Services, Jul. 6-10, 2009, pp. 1-8.
(Continued)

*Primary Examiner* — Brendan Y Higa
(74) *Attorney, Agent, or Firm* — Fleit Intellectual Property Law; Jose Gutman

(57) ABSTRACT

An information processing system, a computer readable storage medium, and a method for distributing an application among computing nodes in a distributed processing system. The method estimates a cost of storing information pertaining to the application on different computing nodes; estimates a cost for computing resources required to execute the application on different computing nodes; estimates a cost of inter-node communication required to execute the application on different computing nodes; and selects at least one computing node to execute the application based on minimizing a total of at least one of the cost estimates.

17 Claims, 9 Drawing Sheets

(51) Int. Cl.
*H04L 12/24* (2006.01)
*G06F 8/60* (2018.01)

(52) U.S. Cl.
CPC .......... *H04L 41/14* (2013.01); *H04L 41/5041* (2013.01); *H04L 47/762* (2013.01); *H04L 67/10* (2013.01); *H04L 67/1097* (2013.01)

(58) Field of Classification Search
CPC ................. H04L 41/14; H04L 67/1002; H04L 67/1004–1014; H04L 67/34; G06F 8/60–64
See application file for complete search history.

(56) References Cited

U.S. PATENT DOCUMENTS

| | | | |
|---|---|---|---|
| 9,280,683 B1* | 3/2016 | Echeverria | G06F 16/134 |
| 9,736,267 B2 | 8/2017 | Seago et al. | |
| 9,813,486 B2 | 11/2017 | Clarke et al. | |
| 9,813,487 B2 | 11/2017 | Clarke et al. | |
| 2006/0015873 A1 | 1/2006 | Dettinger et al. | |
| 2008/0276244 A1 | 11/2008 | Iyengar | |
| 2009/0326988 A1 | 12/2009 | Barth et al. | |
| 2011/0191773 A1 | 8/2011 | Pavel et al. | |
| 2011/0320520 A1* | 12/2011 | Jain | G06F 9/5072 709/203 |
| 2013/0111032 A1 | 5/2013 | Alapati et al. | |
| 2013/0152088 A1* | 6/2013 | Gkantsidis | G06F 16/24 718/100 |
| 2013/0211555 A1* | 8/2013 | Lawson | G05B 19/4185 700/28 |
| 2014/0173112 A1 | 6/2014 | Seago et al. | |
| 2014/0214496 A1* | 7/2014 | Macbeath | G06Q 30/0283 705/7.37 |
| 2014/0325151 A1 | 10/2014 | Kim et al. | |
| 2015/0067169 A1 | 3/2015 | Povolny | |
| 2015/0154211 A1* | 6/2015 | Matsubara | G06F 16/13 707/812 |
| 2015/0193246 A1 | 7/2015 | Luft | |
| 2015/0288746 A1 | 10/2015 | Clarke et al. | |
| 2015/0365291 A1 | 12/2015 | Burton et al. | |
| 2015/0370594 A1* | 12/2015 | Ghosh | G06F 9/45533 718/1 |
| 2016/0057073 A1* | 2/2016 | Steinder | H04L 47/72 709/226 |
| 2017/0097841 A1* | 4/2017 | Chang | H04L 67/10 |
| 2017/0109186 A1 | 4/2017 | Figueroa et al. | |
| 2017/0220394 A1* | 8/2017 | Shim | G06F 9/5044 |

OTHER PUBLICATIONS

Calheiros, R., et al., "Meeting Deadlines of Scientific Workflows in Public Clouds with Tasks Replication," IEEE Transactions on Parallel and Distributed Systems, Jul. 2014, pp. 1787-1796. vol. 25, No. 7.

* cited by examiner

Scenario: a single-task analytics job
Input → computation → output

FIG. 4

Use case 1

COST PARAMETERS → 402

| Item | Value | Unit |
|---|---|---|
| $p_{VM}(r)$ | $0.90 | per hr |
| $N$ | 20 | machines |
| $t$ | 100 | hr |
| $C_{CS}(r)$ | $2,000 | |
| $p_{VM}(s)$ | $0.50 | per hr |
| $p_{XF}(r,s)$ | $0.09 | per GB |
| $V$ | 20000 | GB |

COST CALCULATIONS → 404

| Item | Option 1 (r,r) ← 406 | Option 2 (r,s) ← 408 |
|---|---|---|
| $C_S(r)$ | 0 | 0 |
| $C_{CH}(x) = p_{VM}(r)*N*t$ | $1,800.00 | $1,000.00 |
| $C_{CS}(x)$ | $2,000 | 0 |
| $p_{XF}(r,s)*V$ | 0 | $1,800.00 |
| Subtotal | 3800 ← 414 | 2800 ← 416 |

← 412

← 410

Goal: $\displaystyle\operatorname*{argmin}_{x,y \in R} C_S(x) + C_C(y) + C_M(x,y)$

FIG. 6

Use case 2

COST PARAMETERS ← 602

| Item | Value | Unit |
|---|---|---|
| $p_{VM}(r)$ | $0.90 | per hr |
| $N$ | 200 | machines |
| $t$ | 100 | hr |
| $C_{CS}(r)$ | $0 | |
| $p_{VM}(s)$ | $0.80 | per hr |
| $p_{XF}(r,s)$ | $0.09 | per GB |
| $V$ | 200000 | GB |

COST CALCULATIONS ← 604

| Item | Option 1 ← 606 $y_1 = r$ | Option 2 ← 608 $y_1 = s$ |
|---|---|---|
| $C_S(r)$ | 0 | 0 |
| $C_{CH}(x) = p_{VM}(r)*N*t$ | $18,000.00 | $16,000.00 |
| $C_{CS}(x)$ | $0 | 0 |
| $p_{XF}(r,s)*V$ | 0 | $18,000.00 |
| Subtotal | 18000 ← 614 | 34000 ← 616 |

← 612

$$\underset{x_1, x_2, y_1, y_2 \in R}{\arg\min} \; C_S(x_1, t_1) + C_C(y_1, t_1) + C_M(x_1, y_1, t_1) + C_S(x_2, t_2) + C_C(y_2, t_2) + C_M(x_2, y_2, t_2)$$

← 610

DEPLOYMENT OF MULTI-TASK ANALYTICS APPLICATIONS IN MULTI-CLOUDS

BACKGROUND

The present disclosure generally relates to deployment of applications in distributed networked computing systems, and more particularly relates to a method and system for analyzing deployment costs for analytics applications in multiple clouds processing networked environments.

A cloud computing environment is an infrastructure comprising a network of interconnected nodes.

It is becoming more common to deploy an analytics application over a plurality of nodes in multiple clouds (aka, multi-cloud) systems. Complex analytics applications have strong affinity to data and computation often requiring large amounts of data storage and computation resources. Application deployment in such a processing networked environment is not a trivial task. Data required for the application may be stored in storage nodes distributed in different storage clouds. Computation for the application, e.g., its jobs and tasks, may be distributed and implemented in a plurality of computation nodes in different clouds. Data movement (e.g., data transfer) services for inter-node communications of data can be a significant cost to customers.

Customers of cloud resources and services, whether public clouds or private clouds, face often difficult and confusing decisions as to how to cost-effectively deploy their applications over one or more cloud systems.

BRIEF SUMMARY

According to one embodiment of the present invention, a method is provided for distributing an application among a plurality of networked computing nodes in which users pay a cost for using the computing nodes, the method comprising: estimating a cost of storing information pertaining to the application on different computing nodes of the plurality of computing nodes; estimating a cost for computing resources required to execute the application on different computing nodes of the plurality of computing nodes; estimating a cost of inter-node communication required to execute the application on different computing nodes of the plurality of computing nodes; and selecting at least one computing node from the plurality of computing nodes to execute the application based on minimizing a total of the cost estimates for at least one of: storing information pertaining to the application on at least a first computing node of the plurality of computing nodes; computing resources required to execute the application on at least a second computing node of the plurality of computing nodes, the second computing node being separate than the first computing node; and inter-node communication required to execute the application using at least the first computing node and the second computing node.

According to an embodiment of the invention, a computer-implemented method is provided in a distributed processing system comprising a deployment controller, implemented by software, and a deployment cost analyzer, implemented by software, the computer-implemented method for distributing an application among a plurality of networked computing nodes in the distributed processing system comprising a multi-cloud processing networked environment including a storage cloud that includes a plurality of computing nodes and a computation cloud that includes a plurality of computing nodes, and being separate from the storage cloud, the computer-implemented method comprises: estimating a cost of storing information pertaining to the application on different computing nodes of the plurality of computing nodes; estimating a cost for computing resources required to execute the application on different computing nodes of the plurality of computing nodes; estimating a cost of inter-node communication required to execute the application on different computing nodes of the plurality of computing nodes; and selecting at least one computing node from the plurality of computing nodes to execute the application based on minimizing a total of the cost estimates for at least one of: storing information pertaining to the application on at least a first computing node of the plurality of computing nodes; computing resources required to execute the application on at least a second computing node of the plurality of computing nodes, the second computing node being separate than the first computing node; and inter-node communication required to execute the application using at least the first computing node and the second computing node.

According to various embodiments, the above described method can be implemented with an information processing system and with a computer readable storage medium.

According to another embodiment of the present invention, an information processing system comprises: memory; a deployment controller for at least determining a minimized cost deployment configuration of an analytics application deployed by being distributed among a plurality of networked computing nodes that include at least a first computing node and a second computing node in a distributed processing networked environment, the second computing node being separate from the first computing node; a deployment cost analyzer for at least analyzing costs of alternative deployment configurations for deploying the analytics application distributed over the plurality of networked computing nodes; and at least one processor, communicatively coupled with the memory, the deployment controller, and the deployment cost analyzer, the at least one processor, responsive to executing instructions, performs the method comprising: estimating a cost of storing information pertaining to the analytics application on different computing nodes of the plurality of computing nodes; estimating a cost for computing resources required to execute the analytics application on different computing nodes of the plurality of computing nodes; estimating a cost of inter-node communication required to execute the analytics application on different computing nodes of the plurality of computing nodes; and selecting at least one computing node from the plurality of computing nodes to execute the analytics application based on minimizing a total of the cost estimates for at least one of: storing information pertaining to the analytics application on at least a first computing node of the plurality of computing nodes; computing resources required to execute the analytics application on at least a second computing node of the plurality of computing nodes; and inter-node communication required to execute the analytics application using at least the first computing node and the second computing node.

According yet to another embodiment of the present invention, a computer readable storage medium comprises computer instructions which, responsive to being executed by a processor, cause the processor to perform operations to distribute an application among a plurality of networked computing nodes in a distributed processing system, the operations comprising: estimating a cost of storing information pertaining to the application on different computing nodes of the plurality of computing nodes; estimating a cost for computing resources required to execute the application on different computing nodes of the plurality of computing nodes; estimating a cost of inter-node communication required to execute the application on different computing nodes of the plurality of computing nodes; and selecting at least one computing node from the plurality of computing nodes to execute the application based on minimizing a total of the cost estimates for at least one of: storing information pertaining to the application on at least a first computing node of the plurality of computing nodes; computing resources required to execute the application on at least a second computing node of the plurality of computing nodes, the second computing node being separate than the first computing node; and inter-node communication required to execute the application using at least the first computing node and the second computing node.

BRIEF DESCRIPTION OF THE SEVERAL VIEWS OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 4 is a diagram showing in tabular form an example set of given and/or known parameters, and related deployment cost calculations, for deployment of the analytics application in the multi-cloud networking environment of FIG. 3;

FIG. 6 is a diagram showing in tabular form an example set of given and/or known parameters, and related deployment cost calculations, for deployment of the analytics application in the multi-cloud networking environment of FIG. 5;

DETAILED DESCRIPTION

Figure 1:
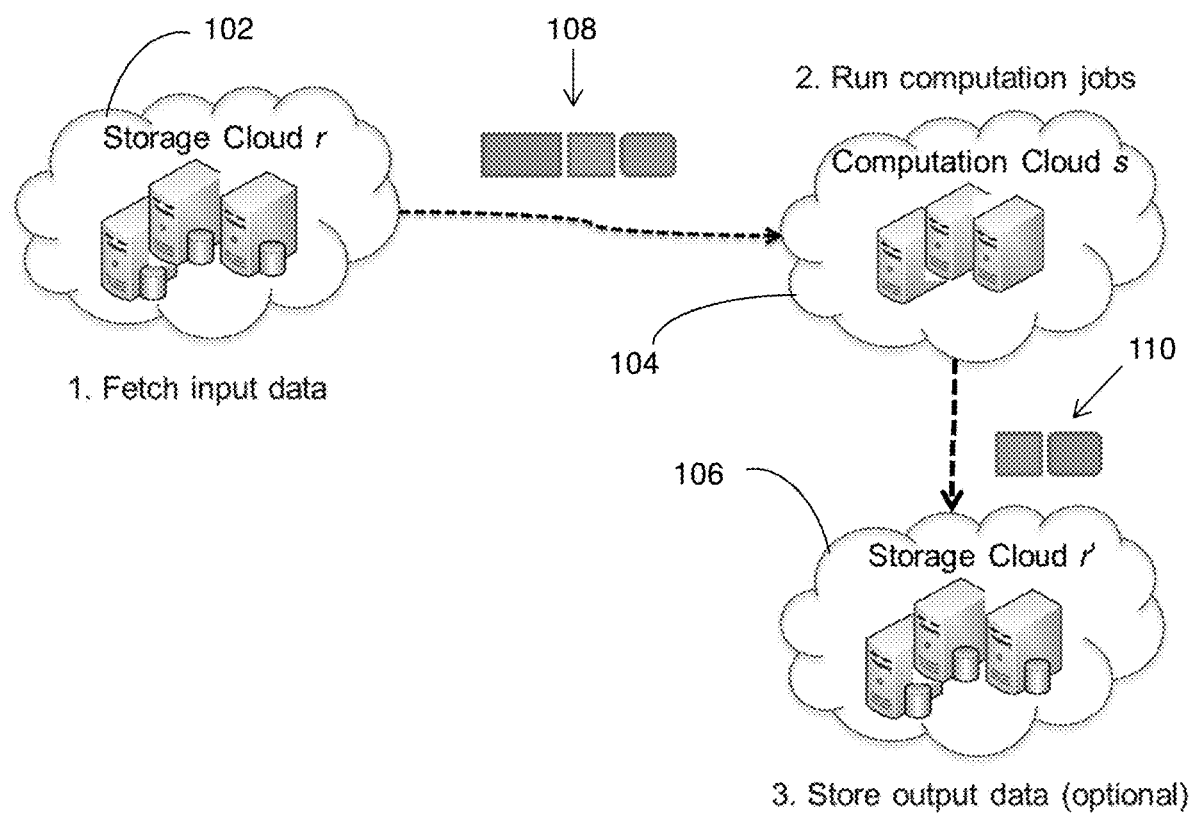
FIG. 1 is a block diagram illustrating an example of a single task analytics job having data storage and data computations distributed in multiple clouds processing networked environment, according to various embodiments of the present disclosure.

It is understood in advance that although this disclosure includes a detailed description related to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

It is becoming more common to deploy an analytics application over nodes in multiple clouds (aka, multi-cloud) systems. Application deployment in such a processing networked environment is not a trivial task. Data required for the application may be stored in storage nodes distributed in different storage clouds. Computation for the application, e.g., its jobs and tasks, may be distributed and implemented in a plurality of computation nodes in different clouds. Data movement (e.g., data transfer) services for inter-node communications of data can be a significant cost to customers.

For example, Amazon is a cloud provider (CP) that provides a public cloud system called Amazon Web Services (AWS). AWS is a pay as you go public cloud system. Storage resources, computation resources, and data transfer services, can be accessed as needed and paid as they are used. The AWS system is broken into separate regions (e.g., us-east, us-west-1, us-west-2, eu-west, etc.) Each region has its own data centers, comprising storage resources, computing resources, and data transfer services, and accordingly offers these resources at its own schedule of charges to customers. Other examples of public cloud systems, with similar resources and services offerings to customers, include Azure, SoftLayer, and the like. Private cloud systems have their own costs for storage resources, computing resources, and inter-node data transfer services.

Customers of these CP services, whether public or private, face often difficult and confusing decisions as to how to best deploy their applications over one or more cloud systems. Computation environment is not easy to replicate across clouds. Additionally, complex analytics applications have strong affinity to data and computation often requiring large amounts of data storage and computation resources. For example, data can sit on a storage cloud node, and then transfer of a large amount of data from the storage cloud node to one or more computation nodes in a separate computation cloud can take significant data transfer time and cost money. Therefore, in view of all of these costs considerations which can vary between cloud computing systems, cloud regions, and cloud network configurations, and which can also vary over time, to make a cost-effective decision how to deploy an application in such a networking environment it is important to have a good understanding of the costs for data storage, data computation, and data movement, for each of the many alternative possible configurations of their application deployment model.

A discussion of various embodiments of the present disclosure will be provided below illustrating in more detail several examples.

FIG. 1 illustrates an example of a single task analytics job in a distributed processing system such as a multi-cloud processing networked environment where there is input data storage in a first storage cloud node followed by data computation in a second separate computation node in a computation cloud (e.g., using one or more computation nodes in the computation cloud) and then followed by output data storage. The storage cloud and computation cloud are separate and can be in different data centers, i.e. regions.

The cost of storage, computation, and data movement, between storage nodes and computation nodes vary by regions. For example, the cost of one task can be $C_S(r)$: the storage cost of a storage node r in region R, plus $C_C(s)$: the computation cost of executing the task at a computation node s in region S, and plus $C_M(r,s)$: the data movement cost from r to s. To determine the best cost-effective application deployment configuration in a given multi-cloud processing networked environment a deployment cost analyzer 930 of an information processing system 900 (see FIG. 9) can analyze each possible alternative application deployment configuration for deploying the application in the multi-cloud processing networked environment. The deployment cost analyzer 930 compares the determined total cost of each of the alternative configurations to the determined total cost of the other possible alternatives. The deployment cost analyzer 930 determines which one or more of the analyzed alternatives is a low cost (or the lowest cost) alternative that meets all other non-cost-related requirements for deployment of the application, and the best alternative is selected. The selection can include human user intervention where the alternatives are presented to the user as options to select one of the options. In certain embodiments, the information processing system 900 can automatically, without human intervention, select the best alternative and then can deploy the application accordingly. The information processing system 900 thereby can remove significant burden and uncertainty from a user having to manually select a particular application deployment configuration for deploying the application in the given distributed processing system, such as a multi-cloud processing networked environment.

A goal of the deployment cost analyzer 930, according to the example, is to minimize the total cost of deployment of the application in the multi-cloud processing networked environment. To determine which alternative configuration provides the best lowest cost of deploying the application, the deployment cost analyzer 930 can use the following equation, where the nodes r and s, and all associated cost parameters, are given and/or known.

$$\operatorname*{argmin}_{r,s \in R} C_S(r) + C_C(s) + C_M(r, s)$$

In the example of FIG. 1, a storage node in the storage cloud 102 stores the data for computation with one or more computation nodes in the computation cloud 104. The input data is fetched from the storage cloud 102 and transferred 108 to the computation cloud 104 in which the one or more computation nodes are used for computation on the transferred data. Then, the output data (resulting from the computations) is transferred out 110 to an optional storage cloud 106.

Often, the amount of output data transferred out 110 from the computation cloud 104 is very small (e.g., on the order of Megabytes or Gigabytes) as compared to the amount of input data (e.g., on the order of hundreds of Terabytes) transferred in 108 to the computation cloud 104. Typically, the very small output data being transferred out 110 has a very low or negligible cost of data transfer. This single task analytics job scenario illustrates, for example, how there can be a data storage cost at region R, a data computation cost at region S, and a data movement (e.g., data transfer) cost from region R to region S.

Figure 2:
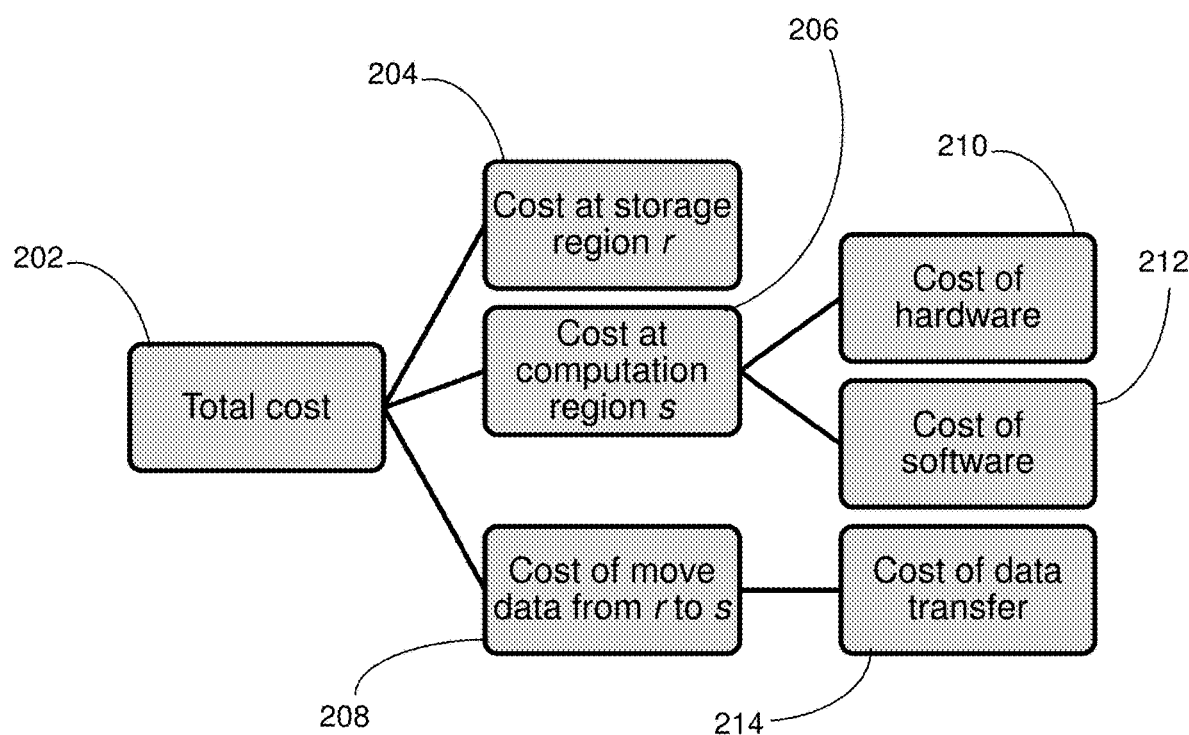
FIG. 2 is a block diagram illustrating an example of analyzing total cost of deployment of an analytics application, according to various embodiments of the present disclosure.

FIG. 2 shows an example analysis of a total cost 202 of deploying an application in a distributed processing system such as a cloud computing environment, e.g., as illustrated in FIG. 1. This example analysis can be performed by the deployment cost analyzer 930 to compare different alternatives for deployment of an application in a networking environment, as will be discussed below with reference to FIG. 9. The total cost 202 includes the cost of data storage at region R 204 and the cost of data computation at region S 206, as well as the cost of moving data from region R to region S 208.

The cost of computation at region S 206 includes the cost of deploying hardware 210 and the cost of deploying software 212. The cost of hardware 210 can include the cost of deploying one or more machines, which can be deployed as one or more virtual machines or actual machines or a combination thereof, and which typically varies by region, e.g. by data centers and by clouds in the region. The cost of software 212 can include the cost of installation, the cost of configuring software, the cost of licensing software, and the cost of personnel to set up and operate the software. For example, there may be a cost of migrating software from one cloud environment to another cloud environment.

The cost of data storage is typically charged by a cloud provider and it varies by region offered by the cloud provider. The cost of data movement, e.g., data transfer between nodes is typically charged by one or more cloud providers and can vary based on a source node and a destination node, the region in which each of the source node and the destination node are part of, and the one or more cloud providers. Often, data movement cost between nodes that are closely located in the same cloud provider and region, are reduced to a negligible or zero cost.

The cost of moving data from region R to region S 208 includes typically the cost of data transfer 214. However, there may be other cost components that can be part of a total cost of moving data from a first node in region R to a second node in region S. For example, there may be other logistics required to facilitate the data transfer from region R to region S.

Example Use Cases

With reference to FIGS. 3, 4, 5, and 6, two example use cases will be discussed below according to various embodiments of the present disclosure. For the sake of an example, the present discussion involves human genomics and the analysis of related data. According to the example, Amazon's AWS provides a large public database of human genomes stored in their AWS cloud system which is located in region R 308 also referred to as us-east-1. The total size of this genome database is 200 Terabytes. The human genomics public database can be found at http://aws.amazon.com/datasets/Biology/4383.

According to the present example, a European university wants to analyze the human genome data provided in the large database stored by Amazon's AWS region R 308. The European university has its own private cloud region S 310 that it can use as an alternative to using the Amazon AWS cloud system for storage and computation.

In the first use case, a one task analytics job scans 1/10 of the genomics database in the Amazon's AWS region R 308, searches for certain genes of interest using a home-made statistics software application. In the second use case, a two task (aka, two step) analytics job involves, in the first step, scanning the whole genomics database in the Amazon AWS region R 308 using a software application called MapReduce which is publicly available at negligible cost, if not free. The scanning of the whole genomics database finds genes of interest. Then, in the second step, the found genes of interest are correlated with another private MicroArray database of the European university which is located inside its private cloud region S 310. Due to European regulations, the data in the private database can only be stored and analyzed in the private cloud region S 310.

Figure 3:
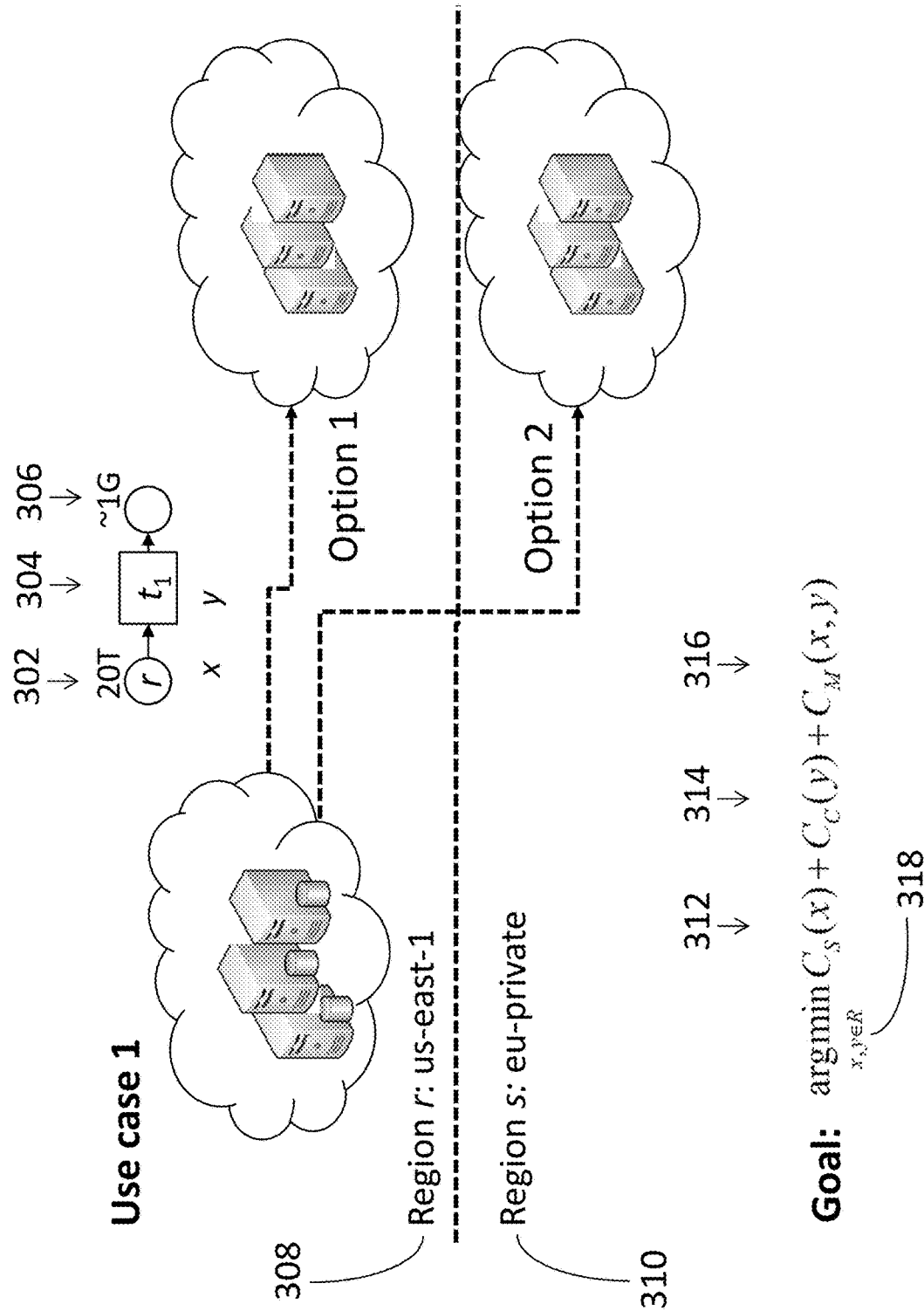
FIG. 3 is a diagram showing a first example use case of deployment of an analytics application in a multi-cloud networking environment.

The first use case will be discussed below with reference to FIGS. 3 and 4. It should be noted in FIG. 3 that 1/10 of the 200 Terabyte genome database stored by AWS in us-east-1 region R 308 is 20 Terabyte data storage. These 20 Terabytes of genome data are stored in storage node r 302 which is in the Amazon AWS cloud system region R 308. A single task computation 304, according to the present example, is performed in a computation node y 304. The resulting output data 306 is expected to be small, only approximately single digit Gigabytes, which requires negligible cost for data transfer and for data storage.

According to the first use case, there are two options. The first option is to perform the computation at a computation node y 304 located in region R 308, i.e., in the us-east-1 in the Amazon AWS cloud system. The second option is to perform the computation at a computation node y 304 located in the European university's private cloud region S 310. That is, the storage node x 302 would be located in region R 308 while the computation node y 304 would be located in region S 310. The goal is to minimize the combination of the data storage cost at storage node x 312, the data computation cost at computation node y 314, and the data movement cost between the storage node x and the computation node y 316. Both the storage node x and the computation node y are given 318 known nodes with associated known costs.

As shown in FIG. 4, according to the first use case, given and known cost parameters 402 are provided in tabular form. Using these given and known cost parameters 402, several cost calculations 404 are performed as shown in the two columns for comparing deployment configuration option 1 406 to option 2 408. Since the Amazon AWS system charges no storage cost for storing this public genome database, both option 1 406 and option 2 408 have zero storage cost in region R 308.

The cost of computation hardware ($C_{ch}$) for option 1 406 is $1,800.00, which is based on the virtual machine per hour price of $ 0.90 per hour multiplied by 20 virtual machines and then multiplied by 100 hours of execution time. This cost calculation can also be represented by the following equation:

$$C_{CH}(r){:}p_{VM}(r)*N*t$$

On the other hand, the cost for computation hardware ($C_{ch}$) for option 2 408 is $1,000.00 for using a computation node in the European university's private cloud region S 310.

The computation cost of software ($C_{cs}$) for option 1 406 is $2,000.00. This estimated cost of software is given by the user in response to a query from the information processing system 900. The software would have to be migrated and installed in region R 308, resulting in a computation cost for software of $2,000.00.

On the other hand, the computation cost of software ($C_{cs}$) for option 2 408 is zero. That is, the software is already configured and operational in the European university's private cloud region S 310. There is no computation cost for software ($C_{cs}$) used in option 2 408. In analyzing the estimated cost of software, for both options, the value of the cost of software parameter is provided by the user in response to a query from the information processing system 900.

The data movement cost (e.g., data transfer cost) under option 1 406 is zero because both the storage node and the computation node are both in the same region R 308 in the Amazon AWS cloud system. However, under option 2 408 the cost of data movement (e.g., data transfer cost) between the storage node x 302 and the computation node y 304 is calculated as $1,800.00. This $1,800.00 calculation is based on the data transfer rate ($P_{xr}(r,s)$) of $0.09 per Gigabyte data transferred from region R 308 to region S 310, multiplied by the 20,000 Gigabytes of data volume (V) transferred from the storage node in region R 308 to the computation node in region S 310.

The total cost 414 for option 1 406, therefore, is calculated at $3,800.00. On the other hand, the total cost 416 for option 2 408 is calculated at $2,800.00. The goal of the deployment cost analyzer 930 is to select the option with the minimum total cost combination 410 of all the calculated costs from the two options. The total cost for each option includes the cost of storage plus the cost of computation plus the cost of data movement between storage node x and computation node y. As can be seen in the cost calculations table 404, the cost of computation software under option 1 406 is $2,000.00 412 which significantly increases the total cost 414 under option 1 406. Therefore, option 2 408 is the better choice for deployment of the application even while having to pay for moving data from region R 308 in the Amazon AWS system to region S 310 in the European university's private cloud system. By moving the data, it saves in the software re-deployment cost which is $2,000.00 under option 1 406.

Figure 5:
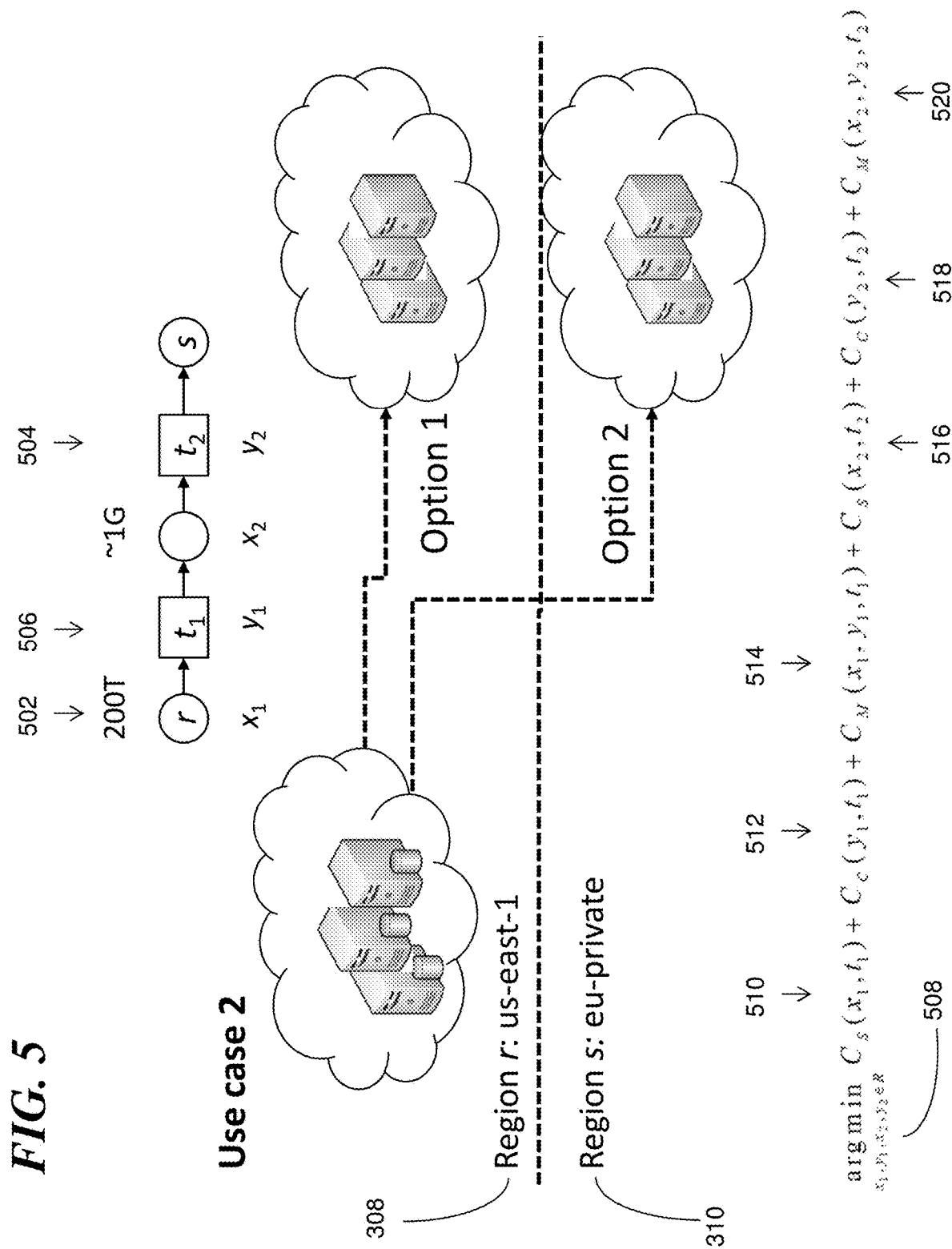
FIG. 5 is a diagram showing a second example use case of deployment of an analytics application in a multi-cloud networking environment.

The second use case will be discussed below with reference to FIGS. 5 and 6. As shown in FIG. 5, according to the present example, the 200 Terabyte database with the human genome data is stored in a storage node $x_1$ 502 in the Amazon AWS cloud system. The second task computation 504 can only be performed at a computation node $y_2$ 504 in the European university private cloud region S 310 due to legal regulation by the European Union. The volume of output data resulting from the computation at the first task $y_1$ 506 is small and the data transfer cost is negligible.

In this example, option 1 uses a computation node $y_1$ 506 in the same Amazon AWS system as the storage node $x_1$ 502. According to option 2 in the example, the task 1 computation node $y_1$ 506 is located in the European university's private cloud region S 310.

According to the example, a goal is to find a minimum of the combination 508 of the storage cost for the first task 510 plus the computation cost for the first task 512, plus the data movement cost between the storage and computation nodes of the first task 514, plus the storage cost for the second task 516, plus the computation cost for the second task 518 and plus the data movement cost between the storage node and the computation node in the second task 520. The storage node and computation node costs for the first task and the storage node and computation node costs for the second task are all given and/or known parameter values.

Referring to FIG. 6, according to the second use case there are several cost parameters 602 and there are cost calculations 604 using the cost parameters 602. The cost calculations 604 result in total costs 614, 616, respectively for the first option 606 and the second option 608 as shown. The goal in selecting the best option, selected from option 1 or option 2, is to select the minimum total cost combination 610 of all the calculated costs from the two options. The total cost for each option includes the cost of storage plus the cost of computation plus the cost of data movement between the storage node $x_1$ and the computation node $y_1$.

According to the first option 606, the computation node $y_1$ 506 under the first task is in the AWS region R 308 and thereby is close to the data storage node $x_1$ 502 also in the AWS region R 308. According to the second option 608, the computation node $y_1$ 506 is in the private cloud region S 310.

As can be seen in FIG. 6, in both option 1 606, and option 2 608 the storage costs for the data storage node $x_1$ 502 are zero because the Amazon public genome storage is offered for free. According to option 1 606, the computation cost hardware ($C_{ch}$) is $18,000.00. This hardware cost is calculated based on an hourly price of a virtual machine of $0.90 per hour multiplied by the number of virtual machines (i.e., 200 machines) used for 100 hours of total execution time. According to option 2 608, the cost of computation hardware ($C_{ch}$) is $16,000.00, which is the cost of using the computation hardware in the European university's private cloud region S 310.

The cost of computation software ($C_{cs}$) under both option 1 606 and option 2 608 is zero. That is, the software application used in both options is publicly available for free.

The data movement cost (e.g., data transfer cost) 612, however, is significantly higher under option 2 608 as compared to option 1 606. The data movement cost 612 under option 2 608 is calculated as $18,000.00. That is, this $18,000.00 calculation is based on the data transfer rate ($P_{xr}(r,s)$) of $0.09 per Gigabyte data transferred multiplied by the 200,000 Gigabytes of data volume (V) transferred from the storage node in region R 308 to the computation node in region S 310. The goal of the deployment cost analyzer 930 is to select the option with the minimum total cost combination 610 of all the calculated costs from the two options. The total cost for each option includes the cost of storage plus the cost of computation plus the cost of data movement between the storage node $x_1$ and the computation node $y_1$. As can be seen in the cost calculations table 604, under option 1 606 the total cost 614 is $18,000.00, while under option 2 608 the total cost 616 is $34,000.00. Option 1 is the better choice because by executing the first analytics job close to where the data is stored in region R 308 will save a significant amount of data transfer cost 612 for transferring the 200 Terabytes of data from region R 308 to region S 310.

Estimation of the Total Time of Running an Analytics Job

The cost of computation hardware typically involves a multiplier of the cost of each machine (i.e., virtual machine, physical machine, or a combination of both virtual and physical machine) per hour multiplied by the number of machines used and multiplied times the total number of hours of execution time. The total number of hours of running an analytics job, according to one embodiment, can be automatically estimated using a prediction model as will be discussed below. However, if this prediction model is not available due to insufficient information, a user may be asked to give an estimation of the total execution time (such as via a user interface of an information processing system) for the calculations of cost of computation hardware.

Figure 7:
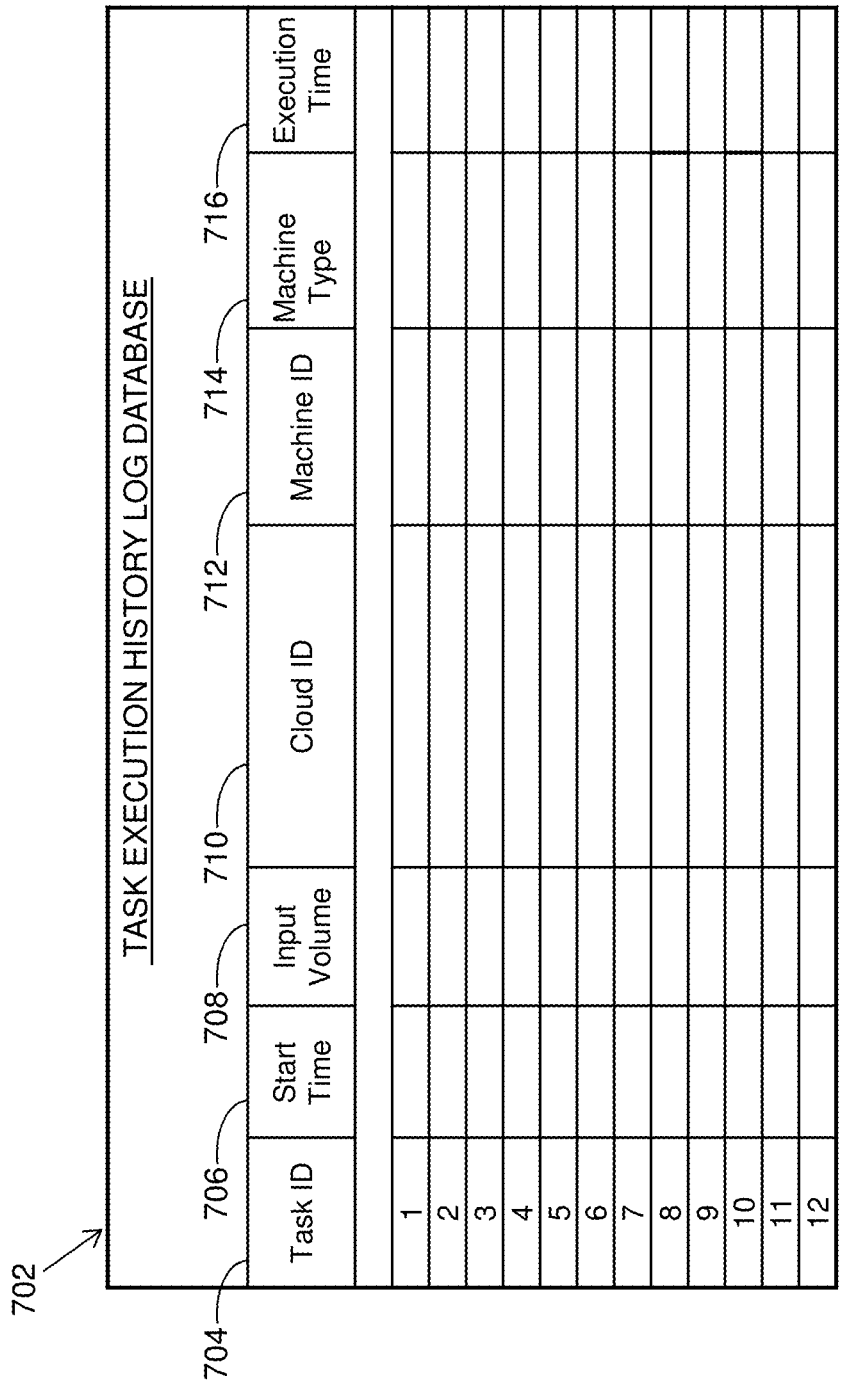
FIG. 7 is a diagram showing in tabular form an example task execution history log database, according to various embodiments of the present disclosure.

A prediction model for the total execution time may be based on an analysis of task execution history log information stored in a database 702 as shown in FIG. 7. Certain feature vector data may be collected from each task that is executed by one or more computation nodes and then is stored in the database 702. One example of execution log data for each task may include a task ID 704 (or task name), a task start time 706, the volume of input data 708, the cloud ID 710 (or cloud name), the one or more machine IDs 712 used for the computation hardware during execution of the particular task, the one or more machine types 714, and the total execution time 716 that was measured for executing the particular task. A prediction model may use a KNN clustering algorithm, for example, built for the particular task based on many task execution logs of that particular task stored in the history database 702. When a new instance of that particular task is to be considered for computation hardware cost, its feature vector is provided to the prediction model which then uses the feature vector information to analyze the past task execution history log information stored in the database 702 to estimate and predict the execution time for the new instance of the particular task on at least one computation node in an application deployment configuration. For example, a task run-time estimator can automatically estimate a total execution time of the particular task (or optionally a plurality of tasks) of the application by analyzing task execution history log information associated with past executions of the particular task (or optionally associated with past executions of the plurality of tasks) and based on a prediction model using the analysis of the task execution history log information.

When this prediction model is not available, such as due to insufficient log data, an information processing system may query a user (such as via a user interface) to provide a total execution time estimate for at least one task of the application. The user can provide the requested estimate such as via a user interface with an information processing system 900.

Example Operational Sequence for an Information Processing System

Figure 8:
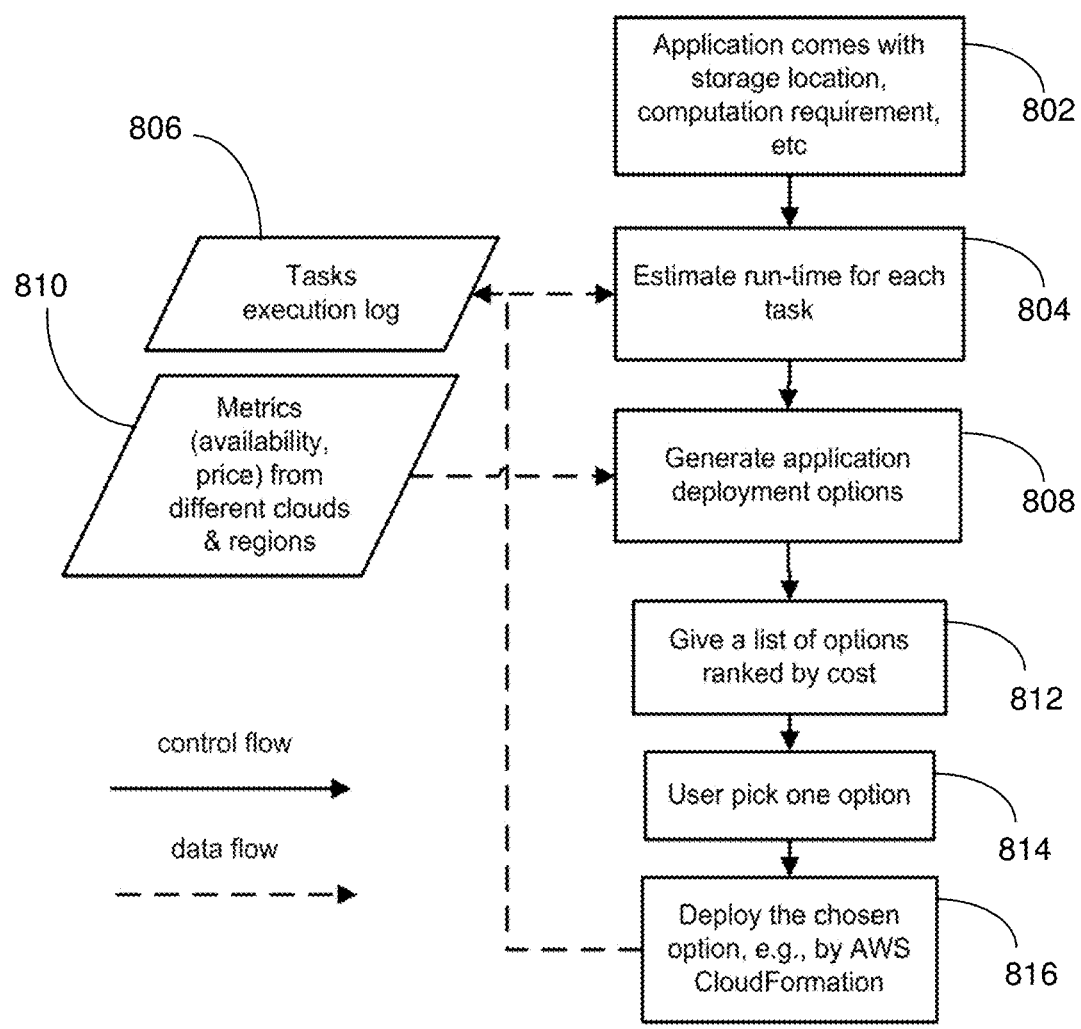
FIG. 8 is an example operational sequence for an information processing system that analyzes deployment costs of alternative deployment configurations of an analytics application in a multi-cloud networking environment and then cost-effectively deploys the analytics application, according to various embodiments of the present disclosure.
Figure 9:
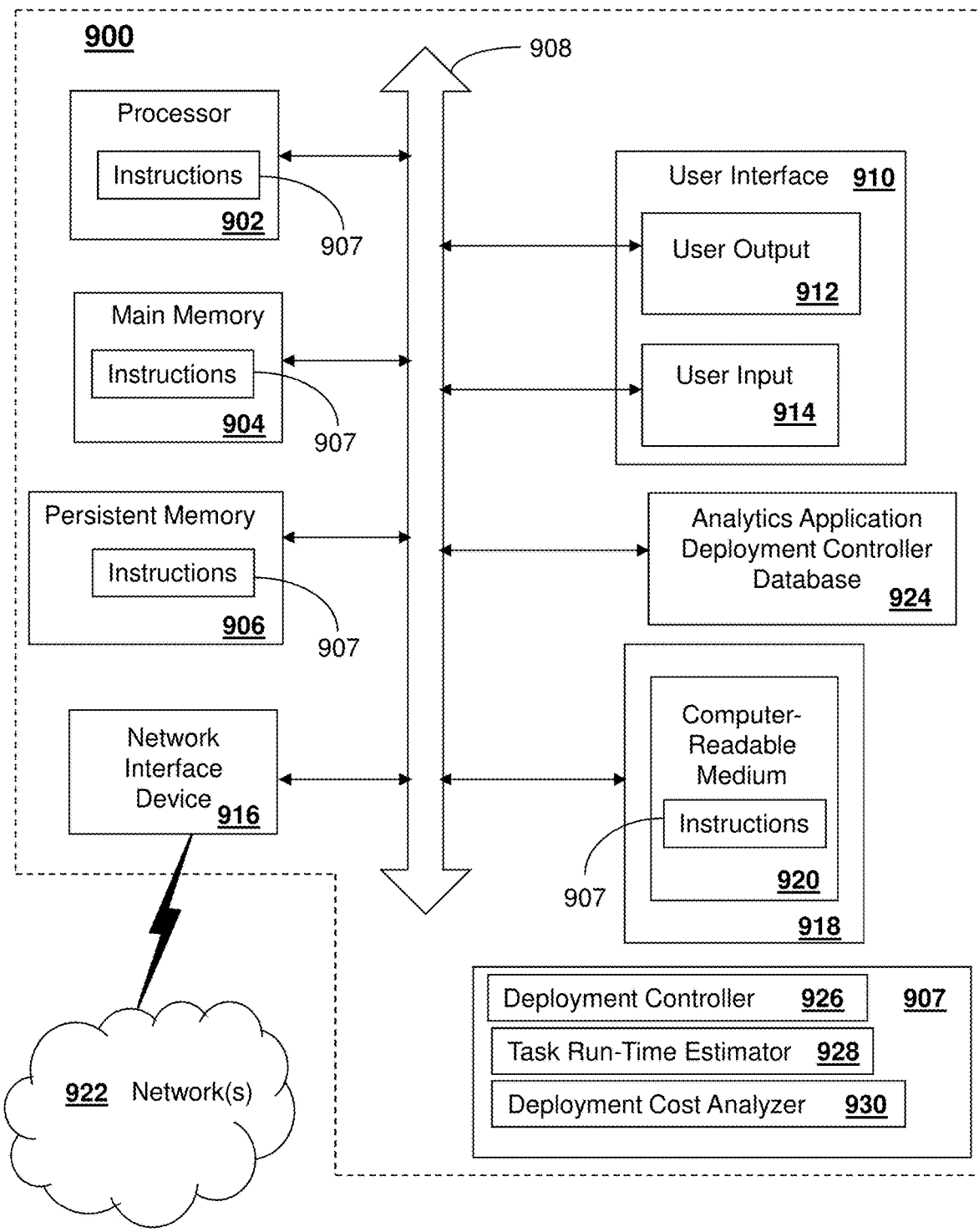
FIG. 9 is an example information processing system suitable for performing the operational sequence of FIG. 8, in accordance with various embodiments of the present disclosure.

FIG. 8 shows an example of an operational sequence that may be used by an information processing system, such as the example information processing system 900 illustrated in FIG. 9. The operational sequence may be followed by the information processing system 900 to deploy one or more analytics applications in a distributed processing system such as a multi-cloud system. An application is received, at step 802, with various specified requirements such as data storage location, data storage requirement, data computation requirement, and the like. The information processing system 900 estimates, at step 804, a run time for each task associated with the received application. Optionally, if the estimation is not possible due to such factors as unavailable history log for a particular task, then the user is queried to provide the estimated execution time for the task.

The information processing system 900 uses the task execution history log 806 such as that shown in the database 702 of FIG. 7. The information processing system 900 generates, at step 808, application deployment options based on metrics 810 which may include availability, price, and other parameters from different clouds and regions. The information processing system 900, at step 812, provides a list of options for deployment of the application, the options ranked by cost. A user, at step 814, is prompted to select one of the options. The information processing system 900, at step 816, in response to the user instructions and selection of an option deploys the application in the chosen option for application deployment configuration. The information processing system 900 then updates the task execution log 806 accordingly to track the execution history of the one or more tasks being executed according to the selected option.

Example of an Information Processing System

FIG. 9 illustrates an example of an information processing system, according to various embodiments of the present disclosure. As shown in FIG. 9, an information processing system 900 is communicatively coupled with the networking environment 922 which can include one or more cloud computing systems, as have been discussed above. According to this example, at least one processor 902, responsive to executing instructions 907, performs operations to communicate with the deployment controller 926 via bus architecture 908, as shown. The at least one processor 902 is communicatively coupled with main memory 904, persistent memory 906, and a computer readable medium 920.

The computer readable medium 920, according to the present example, is communicatively coupled with a reader/writer device 918 that is communicatively coupled via the bus architecture 908 with the at least one processor 902. The instructions 907, which can include instructions, configuration parameters, and data, may be stored in the computer readable medium 920, the main memory 904, the persistent memory 906, and in the processor's internal memory such as cache memory and registers, as shown.

The information processing system 900 includes a user interface 910 that comprises a user output interface 912 and user input interface 914. Examples of elements of the user output interface 912 can include a display, a speaker, one or more indicator lights, one or more transducers that generate audible indicators, and a haptic signal generator. Examples of elements of the user input interface 914 can include a keyboard, a keypad, a mouse, a track pad, a touch pad, a microphone that receives audio signals. The received audio signals, for example, can be converted to electronic digital representation and stored in memory, and optionally can be used with voice recognition software executed by the processor 902 to receive user input data and commands.

A network interface device 916 is communicatively coupled with the processor 902 and provides a communication interface for the information processing system 900 to communicate via one or more networks 922. For example, the processor 902 can communicate messages via the one or more networks 922 with administration facilities of cloud providers (CP) to request and receive application deployment configuration information from the CP, such as the possible configurations of storage clouds and computation clouds and the associated cost parameters of these resources and services, e.g., the prices of these resources and services offered to customers by the CP. Further, as another example, the processor 902 can communicate messages via the one or more networks 922 with the administration facilities of the CP to order and start deployment of a particular application deployment configuration in a multi-cloud processing networked environment that is selected as the best option by, or for, the user.

The networks can include wired and wireless networks, and can be any of local area networks, wide area networks, or a combination of such networks. For example, wide area networks including the internet and the web can intercommunicate the information processing system 100 with other one or more information processing systems that may be locally, or remotely, located relative to the information processing system 900. It should be noted that mobile communications devices, such as mobile phones, Smart phones, tablet computers, lap top computers, and the like, which are capable of at least one of wired and/or wireless communication, are also examples of information processing systems within the scope of the present disclosure.

The instructions 907, according to the present example, include instructions for a deployment controller 926, instructions for a task run time estimator 928, and instructions for a deployment cost analyzer 930, and related configuration parameters and data. It should be noted that any portion of the instructions 907 can be stored in a centralized information processing system or can be stored in a distributed information processing system, i.e., with portions of the system distributed and communicatively coupled together over one or more communication links or networks.

The deployment controller 926 can operate according to the discussions above for determining a cost-effective configuration for an application deployment in a multi-cloud processing networked environment. The example flow diagram shown in FIG. 8 illustrates one possible operational sequence for the deployment controller 926. The task run estimator 928 operates according to the discussions above regarding estimation of a total time of running an analytics job. An example is illustrated with reference to FIG. 7. The deployment cost analyzer 930 interoperates with the deployment controller 926 to analyze, for example, the total costs for alternative application deployment configurations for deploying an application in a multi-cloud processing networked environment. An example deployment cost analyzer 930 can operate according to the discussions above such as with respect to FIG. 2 and the examples discussed above with regards to FIGS. 3 to 6.

In summary, the example information processing system 900, as discussed above, can utilize the deployment controller 926, the task run time estimator 928, and the deployment cost analyzer 930, to provide cost-effective options to a user for deployment of a complex analytics application in a distributed processing system such as a multi-cloud networking environment. The information processing system 900, as has been discussed above, can receive an application's operating requirements in the networking environment, such as required data storage and data computation, and other constraints, and then can analyze the costs of many different alternative configurations for deployment of the application in the networking environment. The system 900 then provides alternative options to the user to select the most cost-effective alternative option for deployment of the application in a processing networked environment. In this way, the information processing system 900 can assist a user to make a cost-effective decision with options for how to deploy the application in such a processing networked environment. The provided alternative options, for example, can comprise presentation to a user (such as via a user interface display) of different possible application deployment configurations and associated costs for deploying an application in a multi-cloud processing networked environment, including the costs for data storage, costs for data computation, and costs for data movement between nodes in the multi-cloud processing networked environment.

Re-Optimization and Dynamic Migration

Re-optimization and dynamic migration of an application from a current deployment configuration of resources to an alternative deployment configuration of available resources may be needed during an analytics job run-time. For example, an analytics job may not be able to continue to run in the current application deployment configuration in a multi-cloud processing networked environment for many reasons. Examples of such reasons include the occurrence of any of the following conditions: when any selected storage cloud and/or computation cloud becomes unavailable for the current analytics job; when one or more selected computation nodes in a computation cloud become unreasonably slow to meet the current computation requirements; and when data transfer between the selected storage node in a storage cloud and the selected one or more computation nodes in a computation cloud becomes unreasonably slow.

According to various embodiments, the information processing system 900 can monitor the execution of one or more jobs in the current selected application deployment configuration in a multi-cloud processing networked environment. The information processing system 900, for example, can receive via the one or more networks 922 continuous or periodic communication of status information from an administration facility of the multi-cloud processing networked environment. In this way, the information processing system 900 can receive status updates on the progress and performance of the job tasks deployed in the particular selected configuration of nodes in a storage cloud and in a computation cloud.

The information processing system 900 can determine from received status information from the administration facility that, for example, the current application deployment configuration is experiencing unacceptable delays in data computation (job run-time), unacceptably slow data movement between nodes (e.g., between a storage node and one or more computation nodes) in the multi-cloud processing networked environment, or unavailability of storage cloud resources or computation cloud resources that were selected in the current application deployment configuration.

Based on receiving the status information and determining the occurrence of an unacceptable performance/operational condition or that one or more selected resources have become unavailable, the information processing system 900 can dynamically change the current application deployment configuration in the multi-cloud processing networked environment to adapt the deployed application to changing conditions of the environment. For example, the information processing system 900 can dynamically migrate an application with executing jobs from a current deployment configuration of previously selected resources to an alternative deployment configuration of currently available resources. According to the example, the information processing system 900 can modify at least one of the estimated costs in response to determining one or more changes in the distributed processing system, such as a multi-cloud processing networked environment. The one or more changes can include: a change in storing information pertaining to the application on at least one selected computing node, a change in computing resources required to execute the application on the at least one selected computing node, and a change in inter-node communication required to execute the application on a plurality of selected computing nodes in the selected at least one computing node. The information processing system 900 can re-select at least one computing node from a plurality of computing nodes in the distributed processing system to execute the application based on minimizing the total of cost estimates including the modified at least one of the estimated costs.

The information processing system 900, for example, re-runs the application deployment configuration optimization process, as has been discussed above. Based on the deployment cost analyzer 930 analyzing cost parameters of alternative options and comparing total costs of the various alternatives, the information processing system 900 in response to the deployment cost analyzer 930 determining a difference in total cost to deploy an application on different nodes exceeding a threshold, can migrate the application to a different set of nodes.

The information processing system 900, according to the example, determines and selects a new best alternative option for the application deployment configuration which excludes abnormal computation and storage clouds.

Dynamic Assignment of Work to Cloud Nodes

The optimal assignment for a workload in a multi-cloud processing networked environment may change over time. Over extended periods of time, the cost functions may change. For example, it may become more cost effective to execute a computation at a different cloud site or a cloud site may go away and become unavailable. Over shorter periods of time, various characteristics of an analytics application deployed in a multi-cloud processing networked environment may change, affecting optimal assignment of resources.

The information processing system 900, for example, can periodically recalculate cost functions of the currently selected resources in the multi-cloud processing networked environment, and based on the recalculated cost analysis reassigns work (one or more jobs) to cloud resources as needed. That is, for example, the information processing system 900 can periodically re-estimate a cost to deploy an application on different nodes in a system and in response to a difference in cost to deploy the application on different nodes exceeding a threshold, the information processing system 900 can migrate the application to a different set of nodes.

The discussions above have used simple but real world examples to illustrate various embodiments of the present disclosure. In real life scenarios, an analytics application can utilize many different data sources and can involve a large number of multi-step analytics, which makes the cost analysis and optimization decisions much more difficult to minimize the total cost of executing all tasks of an analytics application. Additionally, regulatory constraints (and other non-cost based parameters) can limit the selection of storage nodes in storage clouds and computation nodes in computation clouds. While the examples discussed above use cost as the optimization goal, other goals such as run-time can be optimized in a similar manner.

Non-Limiting Examples

The present invention may be a system, a method, and/or a computer program product. The computer program product may include a computer readable storage medium (or media) having computer readable program instructions thereon for causing a processor to carry out aspects of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer readable program instructions described herein can be downloaded to respective computing/processing devices from a computer readable storage medium or to an external computer or external storage device via a network or networks, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems), and computer program products according to embodiments of the invention. It will be understood that each block of the flowchart illustrations and/or block functional diagrams, and combinations of blocks in the flowchart illustrations and/or block functional diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or functional block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the computer readable storage medium is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple CPUs or processors can be used equally effectively. Various embodiments of the present disclosure can further incorporate interfaces that each includes separate, fully programmed microprocessors that are used to off-load processing from the processor. An operating system (not shown) included in main memory for the information processing system may be a suitable multitasking and/or multiprocessing operating system, such as, but not limited to, any of the Linux, UNIX, Windows, and Windows Server based operating systems. Various embodiments of the present disclosure are able to use any other suitable operating system. Various embodiments of the present disclosure utilize architectures, such as an object oriented framework mechanism, that allows instructions of the components of operating system (not shown) to be executed on any processor located within the information processing system. Various embodiments of the present disclosure are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The term "analytics application" is intended to broadly mean an application that in its deployment in a networking environment includes a set of one or more analytics jobs. The term "analytics job" comprises a sequence of one or more tasks. The term "task" comprises executing in a cluster of computation nodes in a computation cloud, and which can get input data from, and store output data to, a data storage node in a storage cloud.

The terms "node" and "computing node" are intended to broadly cover many different types of networked processing resources or services, which according to various embodiments can include cloud resources or services, which provide to an application, such as an analytics application, a unit or module of a particular resource or service of either storage or computation. A storage node is part of a storage cloud. A computation node is part of a computation cloud. For example, a storage node in a storage cloud provides a specified unit or module of data storage to an analytics application using the storage cloud. This storage node can be configured for use by the analytics application based on a customer purchase or order of the particular specified unit or module of data storage. A computation node in a computation cloud, as another example, provides a specified unit or module of computation resource to an application, such as an analytics application, using the computation cloud. This computation node can be configured for use by, for example, the analytics application based on a customer purchase or order of the particular specified unit or module of computation resource. A plurality of computation nodes in one or more computation clouds can be provided to an analytics application deployed in a cloud processing networked environment.

The term "job deployment" is intended to broadly mean to deploy each of its consisting tasks into one computation cloud where the task has a place to execute on one or more computation nodes in the computation cloud; and to designate one storage node in a storage cloud for the input data or the output data of certain tasks, if needed. Data is read from, or data is written to, a storage node in the storage cloud only if needed.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. In a distributed processing system comprising a deployment controller, implemented by software, and a deployment cost analyzer, implemented by software, a computer-implemented method for distributing an application among a plurality of networked computing nodes in the distributed processing system comprising a multi-cloud processing networked environment including a storage cloud that includes a plurality of computing nodes and a computation cloud that includes a plurality of computing nodes, and being separate from the storage cloud, the computer-implemented method comprising:

estimating a cost of storing information pertaining to the application on different computing nodes of the plurality of computing nodes;

estimating a cost for computing resources required to execute the application on different computing nodes of the plurality of computing nodes;

estimating a cost of inter-node communication required to execute the application on different computing nodes of the plurality of computing nodes; and selecting at least one computing node from the plurality of computing nodes to execute the application based on minimizing a total of the cost estimates for at least one of:

storing information pertaining to the application on at least a first computing node of the plurality of computing nodes;

computing resources required to execute the application on at least a second computing node of the plurality of computing nodes, the second computing node being separate from the first computing node; and inter-node communication required to execute the application using at least the first computing node and the second computing node; and deploying the application distributed over a selected configuration of the plurality of networked computing nodes; and wherein the distributed processing system comprises the multi-cloud processing networked environment including a public storage cloud and a public computation cloud separate from the public storage cloud, and a private storage cloud and a private computation cloud separate from the private storage cloud, and wherein a computing node selected for storing the information pertaining to the application is in the public storage cloud, and wherein a computing node selected to execute the application is in the private computation cloud, and wherein the estimated cost of inter-node communication comprises the cost of communication of the information between the computing node in the public storage cloud and the computing node in the private computation cloud.

2. The method of claim 1, further comprising:
estimating a cost to deploy the application on different nodes; and
selecting at least one node to execute the application based on a cost estimate to deploy the application.

3. The method of claim 1, further comprising:
periodically re-estimating a cost to deploy the application on different nodes; and
in response to a difference in cost to deploy the application on different nodes exceeding a threshold, migrating the application to a different set of nodes.

4. The method of claim 1, further comprising:
modifying at least one of the estimated costs in response to determining one or more changes in the distributed processing system, the one or more changes comprising
a change in storing information pertaining to the application on at least one selected computing node,
a change in computing resources required to execute the application on the at least one selected computing node, and a change in inter-node communication required to execute the application on a plurality of selected computing nodes in the selected at least one computing node; and
re-selecting at least one computing node from the plurality of computing nodes to execute the application based on minimizing the total of the cost estimates including the modified at least one of the estimated costs.

5. The method of claim 1, wherein the estimating a cost for computing resources required to execute the application on different computing nodes comprises estimating a total execution time of at least one task of the application on the at least a second computing node of the plurality of computing nodes, and wherein the estimating the total execution time of at least one task comprises at least one of:

querying for an estimated total execution time of at least one task of the application by providing user output via a user interface of an information processing system, and receiving the estimated total execution time by receiving user input via the user interface; and
automatically estimating a total execution time of at least one task of the application by
a task run-time estimator analyzing task execution history log information associated with past executions of the at least one task and estimating a total execution time of the at least one task of the application on the at least a second computing node based on a prediction model using analysis by the task run-time estimator of the task execution history log information.

6. The method of claim 1, wherein the application comprises an analytics application, and the method further comprising:
deploying the analytics application distributed over a selected configuration of the plurality of networked computing nodes including the selected at least one computing node from the plurality of computing nodes to execute the analytics application based on minimizing the total of the cost estimates.

7. The method of claim 6, further comprising:
periodically re-estimating a cost to deploy the analytics application on different nodes in the distributed processing system; and
in response to a difference in estimated cost to deploy the analytics application on different nodes exceeding a threshold for minimizing a total of the cost estimates, migrating the analytics application to a different set of nodes.

8. An information processing system comprising:
a memory;
a deployment controller, implemented by software, for at least determining a minimized cost deployment configuration of an analytics application deployed by being distributed among a plurality of networked computing nodes that include at least a first computing node and a second computing node, separate from the first computing node, in a distributed processing networked environment comprising a multi-cloud processing networked environment including a storage cloud that includes a plurality of computing nodes and a computation cloud that includes a plurality of computing nodes, and being separate from the storage cloud;
a deployment cost analyzer, implemented by software, for at least analyzing costs of alternative deployment configurations for deploying the analytics application distributed over the plurality of networked computing nodes; and at least one processor, communicatively coupled with the memory, the deployment controller, and the deployment cost analyzer, the at least one processor, responsive to executing instructions, performs the method comprising:

estimating a cost of storing information pertaining to the analytics application on different computing nodes of the plurality of computing nodes;

estimating a cost for computing resources required to execute the analytics application on different computing nodes of the plurality of computing nodes;

estimating a cost of inter-node communication required to execute the analytics application on different computing nodes of the plurality of computing nodes; and selecting at least one computing node from the plurality of computing nodes to execute the analytics application based on minimizing a total of the cost estimates for at least one of:

storing information pertaining to the analytics application on at least a first computing node of the plurality of computing nodes;

computing resources required to execute the analytics application on at least a second computing node of the plurality of computing nodes; and inter-node communication required to execute the analytics application using at least the first computing node and the second computing node; and wherein the distributed processing networked environment comprises the multi-cloud processing networked environment including a public storage cloud and a public computation cloud separate from the public storage cloud, and a private storage cloud and a private computation cloud separate from the private storage cloud, and wherein a computing node selected for storing the information pertaining to the application is in the public storage cloud, and wherein a computing node selected to execute the application is in the private computation cloud, and wherein the estimated cost of inter-node communication comprises the cost of communication of the information between the computing node in the public storage cloud and the computing node in the private computation cloud.

9. The information processing system of claim 8, wherein the at least one processor, responsive to executing instructions, performs the method further comprising:

estimating a cost to deploy the analytics application on different nodes in the distributed processing networked environment; and selecting at least one node to execute the analytics application based on a cost estimate to deploy the analytics application.

10. The information processing system of claim 8, wherein the at least one processor, responsive to executing instructions, performs the method further comprising:

periodically re-estimating a cost to deploy the analytics application on different nodes in the distributed processing networked environment; and in response to a difference in cost to deploy the analytics application on different nodes exceeding a threshold, migrating the analytics application to a different set of nodes.

11. The information processing system of claim 8, wherein the at least one processor, responsive to executing instructions, performs the method further comprising:

modifying at least one of the estimated costs in response to determining one or more changes in the distributed processing networked environment, the one or more changes comprising a change in storing information pertaining to the analytics application on at least one selected computing node, a change in computing resources required to execute the analytics application on the at least one selected computing node, and a change in inter-node communication required to execute the analytics application on a plurality of selected computing nodes in the selected at least one computing node; and re-selecting at least one computing node from the plurality of computing nodes to execute the analytics application based on minimizing the total of the cost estimates including the modified at least one of the estimated costs.

12. A computer readable storage medium, comprising computer instructions which, responsive to being executed by a processor, cause the processor to perform operations for distributing an application among a plurality of networked computing nodes in a distributed processing system comprising a multi-cloud processing networked environment including a storage cloud that includes a plurality of computing nodes and a computation cloud that includes a plurality of computing nodes, and being separate from the storage cloud, the operations comprising:

estimating a cost of storing information pertaining to the application on different computing nodes of the plurality of computing nodes;

estimating a cost for computing resources required to execute the application on different computing nodes of the plurality of computing nodes;

estimating a cost of inter-node communication required to execute the application on different computing nodes of the plurality of computing nodes; and selecting at least one computing node from the plurality of computing nodes to execute the application based on minimizing a total of the cost estimates for at least one of:

storing information pertaining to the application on at least a first computing node of the plurality of computing nodes;

computing resources required to execute the application on at least a second computing node of the plurality of computing nodes, the second computing node being separate than the first computing node; and inter-node communication required to execute the application using at least the first computing node and the second computing node; and deploying the application distributed over a selected configuration of the plurality of networked computing nodes based on minimizing the total of the cost estimates; and wherein the distributed processing system comprises the multi-cloud processing networked environment including a public storage cloud and a public computation cloud separate from the public storage cloud, and a private storage cloud and a private computation cloud separate from the private storage cloud, and wherein a computing node selected for storing the information pertaining to the application is in the public storage cloud, and wherein a computing node selected to execute the application is in the private computation cloud, and wherein the estimated cost of inter-node communication comprises the cost of communication of the information between the computing node in the public storage cloud and the computing node in the private computation cloud.

13. The computer readable storage medium of claim 12, wherein the processor performed operations further comprising:

estimating a cost to deploy the application on different nodes; and selecting at least one node to execute the application based on a cost estimate to deploy the application.

14. The computer readable storage medium of claim 12, wherein the processor performed operations further comprising:

periodically re-estimating a cost to deploy the application on different nodes; and in response to a difference in cost to deploy the application on different nodes exceeding a threshold, migrating the application to a different set of nodes.

15. The computer readable storage medium of claim 12, wherein the processor performed operations further comprising:

modifying at least one of the estimated costs in response to determining one or more changes in the system, the one or more changes comprising a change in storing information pertaining to the application on at least one selected computing node, a change in computing resources required to execute the application on the at least one selected computing node, and a change in inter-node communication required to execute the application on a plurality of selected computing nodes in the selected at least one computing node; and re-selecting at least one computing node from the plurality of computing nodes to execute the application based on minimizing the total of the cost estimates including the modified at least one of the estimated costs.

16. The computer readable storage medium of claim 12, wherein the estimating a cost for computing resources required to execute the application on different computing nodes comprises estimating a total execution time of at least one task of the application on the at least a second computing node of the plurality of computing nodes, and wherein the estimating the total execution time of the at least one task comprises at least one of:

querying for an estimated total execution time of at least one task of the application by providing user output via a user interface of an information processing system, and receiving the estimated total execution time by receiving user input via the user interface; and automatically estimating a total execution time of at least one task of the application by a task run-time estimator, implemented by software, analyzing task execution history log information associated with past executions of the at least one task and estimating a total execution time of the at least one task of the application on the at least a second computing node based on a prediction model using analysis by the task run-time estimator of the task execution history log information.

17. The computer readable storage medium of claim 12, wherein the application comprises an analytics application, and wherein the processor performed operations further comprising:

deploying the analytics application distributed over a selected configuration of the plurality of networked computing nodes including the selected at least one computing node from the plurality of computing nodes to execute the analytics application based on minimizing the total of the cost estimates.

* * * * *